(12) United States Patent
Jafari et al.

(10) Patent No.: US 9,866,001 B2
(45) Date of Patent: Jan. 9, 2018

(54) ELECTRICAL CONNECTOR WITH RELEASE AND FIT BUTTONS

(71) Applicants: Afshin Jafari, Los Angeles, CA (US); Christopher M. Lolachi, Rancho Palos Verdes, CA (US)

(72) Inventors: Afshin Jafari, Los Angeles, CA (US); Christopher M. Lolachi, Rancho Palos Verdes, CA (US)

( * ) Notice: Subject to any disclaimer, the term of this patent is extended or adjusted under 35 U.S.C. 154(b) by 0 days.

(21) Appl. No.: 14/401,816

(22) PCT Filed: Jan. 28, 2013

(86) PCT No.: PCT/US2013/023506
§ 371 (c)(1),
(2) Date: Nov. 17, 2014

(87) PCT Pub. No.: WO2013/172879
PCT Pub. Date: Nov. 21, 2013

(65) Prior Publication Data
US 2015/0136473 A1    May 21, 2015

Related U.S. Application Data

(60) Provisional application No. 61/648,557, filed on May 17, 2012.

(51) Int. Cl.
*H02G 3/18* (2006.01)
*H02G 3/06* (2006.01)

(52) U.S. Cl.
CPC ...... *H02G 3/0691* (2013.01); *Y10T 29/49947* (2015.01)

(58) Field of Classification Search
CPC .............................. H02G 3/0691; H02G 1/10
USPC ........................................................ 174/656
See application file for complete search history.

(56) References Cited

U.S. PATENT DOCUMENTS

| | | | | |
|---|---|---|---|---|
| 6,020,557 A * | 2/2000 | Jorgensen | ............ | H01R 13/745 174/650 |
| 6,043,432 A * | 3/2000 | Gretz | ................... | H02G 3/0691 16/2.1 |
| 6,114,630 A * | 9/2000 | Gretz | ..................... | H05K 13/00 174/51 |
| 6,133,529 A * | 10/2000 | Gretz | ................... | F16L 37/008 16/2.1 |
| 6,194,661 B1 * | 2/2001 | Gretz | .................. | H01R 13/745 174/153 R |

(Continued)

*Primary Examiner* — Hoa C Nguyen
*Assistant Examiner* — Stanley Tso
(74) *Attorney, Agent, or Firm* — Edwin Tarver (57) ABSTRACT

The present invention is a connector for connecting an electrical cable to an aperture in an electrical panel. The assembled connector has a spring ring, a shell, and a block along a longitudinal axis. The spring ring has a base from which two insertion tabs extend coaxial with the axis. The block has a joining wall and a springing feature. The shell has a through opening coaxial with the axis. The insertion tabs retain the spring ring in the shell's through opening, and the springing feature retains the block in the shell's through opening. The insertion tabs of the spring ring have hook latches extending past the block that lock the connector in the panel. And the base of the spring ring has a hole to receive the cable where first and second clamping tabs clampably lock the cable in the connector.

15 Claims, 10 Drawing Sheets

(56) References Cited

U.S. PATENT DOCUMENTS

| | | | | |
|---|---|---|---|---|
| 6,335,488 B1* | 1/2002 | Gretz | ............... | H02G 3/0691 |
| | | | | 16/2.1 |
| 2004/0177988 A1* | 9/2004 | Kiely | ............... | H02G 3/0691 |
| | | | | 174/656 |
| 2010/0112856 A1* | 5/2010 | Paynter | ............ | H01R 9/0521 |
| | | | | 439/584 |
| 2013/0056263 A1* | 3/2013 | Chavan | ............ | H02G 3/0691 |
| | | | | 174/660 |

* cited by examiner

ELECTRICAL CONNECTOR WITH RELEASE AND FIT BUTTONS

CROSS REFERENCE TO RELATED APPLICATIONS

This application is a national stage of International Patent Application No. PCT/US2013/023506 titled "Electrical Connector With Release And Fit Buttons," filed Jan. 28, 2013, which claims the benefit of U.S. Provisional Application No. 61/648,557, filed May 17, 2012, hereby incorporated by reference in its entirety.

This application is also related to Int. Application No. PCT/US2012/048153 filed Jul. 25, 2012; U.S. application Ser. No. 13/190,116 filed Jul. 25, 2011; and U.S. Provisional Application No. 61/367,882, filed Jul. 27, 2010, also hereby incorporated by reference in their entirety.

BACKGROUND OF THE INVENTION

Technical Field

The present invention relates generally to connectors for connecting electrical cables and flexible conduits to electrical panels, and more particularly to an improved connector that allows easier insertion of a cable into the trailing end of a connector and of the connector into a panel.

Background Art

It is common to use electrical junction boxes or panels in electrical construction wiring. The junction boxes or panels have knock out holes or apertures where electrical cables are connected. For present purposes the label "panel" is used interchangeably to mean a junction box or a panel. Also for present purposes, the label "aperture" is used since it generically applies to holes created in any of various manners. For example, a hole created when a pre-made knock out piece is removed from a wall of a panel is a true knock out hole or an aperture. But similarly, a hole made when a smaller hole is drilled and a knock out die-and-screw set is used to punch out a larger hole is also a knock out hole or aperture. And a hole made when drilled to the desired size is an aperture.

Armored and metallic electrical cables are supplied in different nominal sizes in accordance with typical applications. For example, in the United States the National Electrical Code specifies common sizes. The National Electrical Code, or an equivalent standard, will also specify the materials of electrical cables, and/or will specify the electrical continuity, since this controls grounding between the electrical panel, the connector, and the electrical.

Armored cables (AC) and metal-clad cables (MC) have historically been connected to electrical junction boxes or panels with a tubular connector. Such traditional connectors have a leading end with a threaded nose for insertion into an aperture in the panel, and then tightening of a locknut thereon to secure the connector to the panel. Such connectors further have a trailing end with either a screw passing laterally through the connector wall or a strap and either one or two screws. By inserting a cable and then tightening the screw or screws, the cable is secured and retained in the connector.

Regardless of whether for a single family residence, an apartment building, or a factory, a typical construction project can require hundreds to thousands of connectors and their connection. One consideration for a contractor contemplating such a project is the cost of the connectors, which is usually based on the materials used, the energy, steps count, parts count, etc. needed to manufacture the connectors. Another consideration for the contractor usually also is the cost of the labor to make the connections, both of the connector to the panel and of the cable into the connector.

In particular, using such traditional connectors necessitate the use of appropriate tools to achieve a secure connection, such as using a wrench on the lock nut and a screwdriver on the cable securing screw or screws. It should therefore be appreciated that completing all of these connections, using the mentioned tools on each connection, can be very time consuming.

Several types of snap engagement connectors have recently been introduced as a means to reduce the time and effort required for installation. Although these snap engagement connectors generally may partially or even fully eliminate the need to use tools for installation, they still typically require a lot of effort to snap into the apertures in panels. Alternately, if there is a need for a retrofit or disconnection of the connector, workers may then have to use tools to remove each snap engagement connector involved, which in turn will involve a lot of time and effort.

Accordingly, what is needed is an improved connector for securing an electrical cable to an electrical junction box or panel. Such an improved connector should preferably not require the use of any tools for installing or removing the connector, at either the leading or trailing end. Nonetheless, such an improved connector should preferably allow its leading end to connect quickly and securely to the panel as well as for its trailing end to quickly and securely accept connection of a cable. Such a connector will vastly reduce the time and effort involved for installing or removing electrical cables in structure wiring. The desired connectors must be additionally designed to work with standard electrical junction boxes panels, housings, etc., while allowing quick and easy connection with standard size knock out holes or apertures.

BRIEF SUMMARY OF THE INVENTION

Accordingly, it is an object of the present invention to provide an improved connector for connection of electrical cables to electrical junction boxes and panels.

Briefly, one preferred embodiment of the present invention is a connector for connecting an electrical cable to an aperture in an electrical panel. The connector includes a spring ring, a shell, and a block that collectively have a longitudinal central axis when the connector is assembled. The spring ring has a base from which two insertion tabs extend coaxial with the axis. The block has a joining wall and a springing feature. The shell has a through opening coaxial with the axis. The insertion tabs springingly retain the spring ring in the through opening of the shell, and the springing feature retains the block in the through opening of the shell. The insertion tabs of the spring ring having hook latches extending past the block to snappingly lock the connector in the panel when axially pressed into the aperture. And the base of the spring ring further has a hole to receive the cable when it is axially pressed into the connector where a first clamping tab and a second clamping tab clampably lock the cable in the connector.

Briefly, another preferred embodiment of the present invention is a connector for connecting an electrical cable to an aperture in an electrical panel. The connector includes a spring ring, a shell, and a block that collectively have a longitudinal central axis when the connector is assembled. The spring ring has a base from which two insertion tabs extend nominally coaxial with the axis. The block has a joining wall and a springing feature. The shell has a through opening coaxial with the axis. The insertion tabs springingly retain the spring ring in the through opening of the shell, and the springing feature retains the block in the through opening of the shell. The insertion tabs of the spring ring having hook latches extending past the block to snappingly lock the connector in the panel when axially pressed into the aperture. And the base of the spring ring further has a hole to receive the cable when it is axially pressed into the connector where at least one clamping prong clampably holds the cable against a backing to lock the cable in the connector.

Briefly, another preferred embodiment of the present invention is a connector for connecting an electrical cable to an aperture in an electrical panel. The connector includes a connector body having a longitudinal central axis and a base with a hole, wherein a first locking tab and an opposed second locking tab extend from the base nominally coaxial with the axis, and wherein two opposed guide tabs extend from the base nominally coaxial with the axis. The first locking tab has a first prong and the second locking tab has a second prong and the guide tabs each have jugged-in sections and free tips. The first prong, the second prong, the jugged-in sections, and the free tips are directed toward the axis such that when the cable is axially pressed into the connector body through the hole the cable is guided between the guide tabs, the cable abuts against the free tips, and the cable is clampably locked in the connector between the first prong and the second prong. The guide tabs further each have a side wing and a side section, and the first and second locking tabs further each have a hook latch. The side wings extend past the side sections and the hook latches extend past the side wings. The side wings are directed toward the axis to directingly receive the connector into the aperture such that the side sections abut the panel around the aperture. And the hook latches are directed away from the axis to directingly extend into the aperture and snappingly lock the connector in the aperture.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which:

FIGS. 2a-b are side views of the electrical connector, junction box or panel, and cable of FIG. 1, wherein FIG. 2a shows these elements prior to connection and FIG. 2b shows these elements after connection.

In the various figures of the drawings, like references are used to denote like or similar elements or steps.

DETAILED DESCRIPTION OF THE INVENTION

A preferred embodiment of the present invention is an electrical connector with release and fit buttons. As illustrated in the various drawings herein, and particularly in the views of FIGS. 1 and 10a-b, wherein the embodiments of the invention are depicted by the general reference characters 10 and 100.

Figure 1:
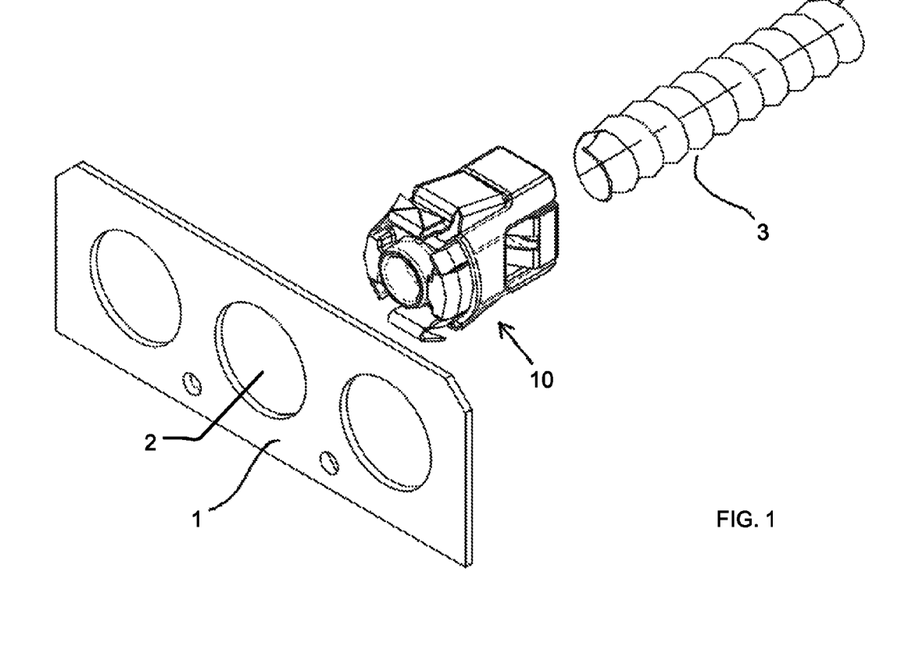
FIG. 1 is an isometric view of an exemplary embodiment of an electrical connector according to the present invention that is aligned with a junction box or panel at a knock out hole or aperture and also aligned with an electrical cable.
Figure 2A:
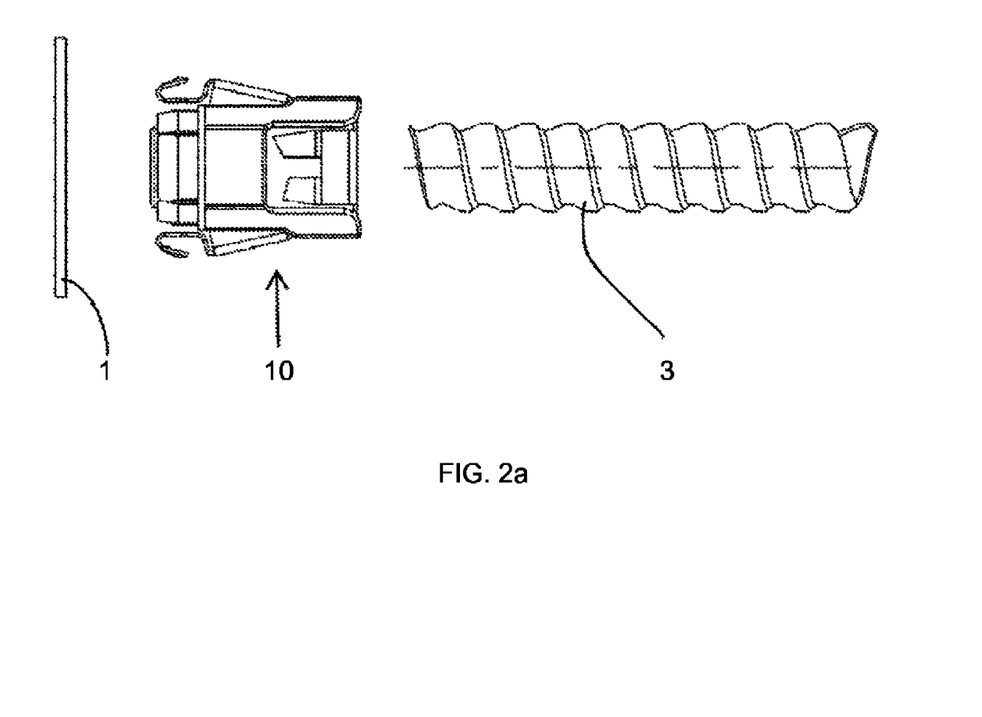
Figure 2B:
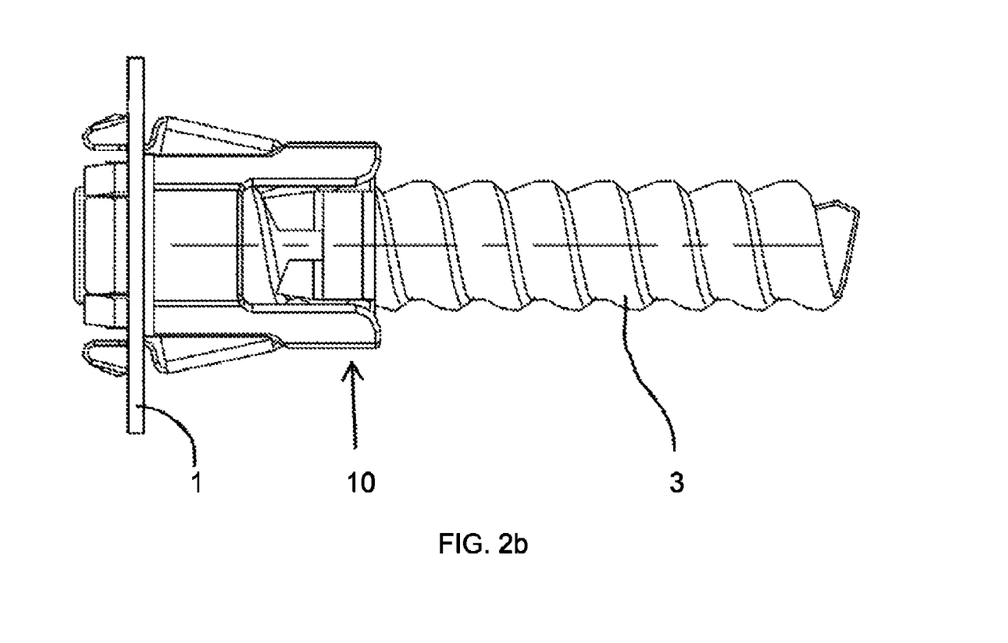

FIGS. 1, 2a-b, and 3 depict one exemplary embodiment of an electrical connector 10 according to the present invention. FIG. 1 is an isometric view of the connector 10 aligned with a knock out hole or aperture 2 in an electrical panel 1 and with an electrical cable 3. FIG. 2a is a side view of the connector 10 prior to connection and FIG. 2b is a side view after connection. As can be seen in these figures, the connector 10 secures into the aperture 2 of the panel 1 and securely receives the cable 3. In practice, the cable 3 will support a plurality of electrical wires (not shown), which may be already present in the cable 3 or installed through the cable 3 later.

The transition from the pre-connection state in FIG. 2a to the post-connection state in FIG. 2b in involves two operations. The connector 10 is snapped into locking engagement in the aperture 2 of the panel 1, and then the cable 3 is pressed into locking engagement with the connector 10. Alternately, the order of these operations can be reversed, pressing the connector 10 onto the cable 3 and then snapping the connector 10 into the aperture 2. How the connector 10 facilitates these snap and press together operations is discussed in detail, presently. It is helpful, however, to appreciate now and throughout this discussion that these operations are manual, here meaning that they can be performed entirely by hand and without any tools. The snap and press insertions here are also essentially linear operations, that is, not requiring any rotational screwing or locking together of pieces to employ the connector 10.

Figure 3:
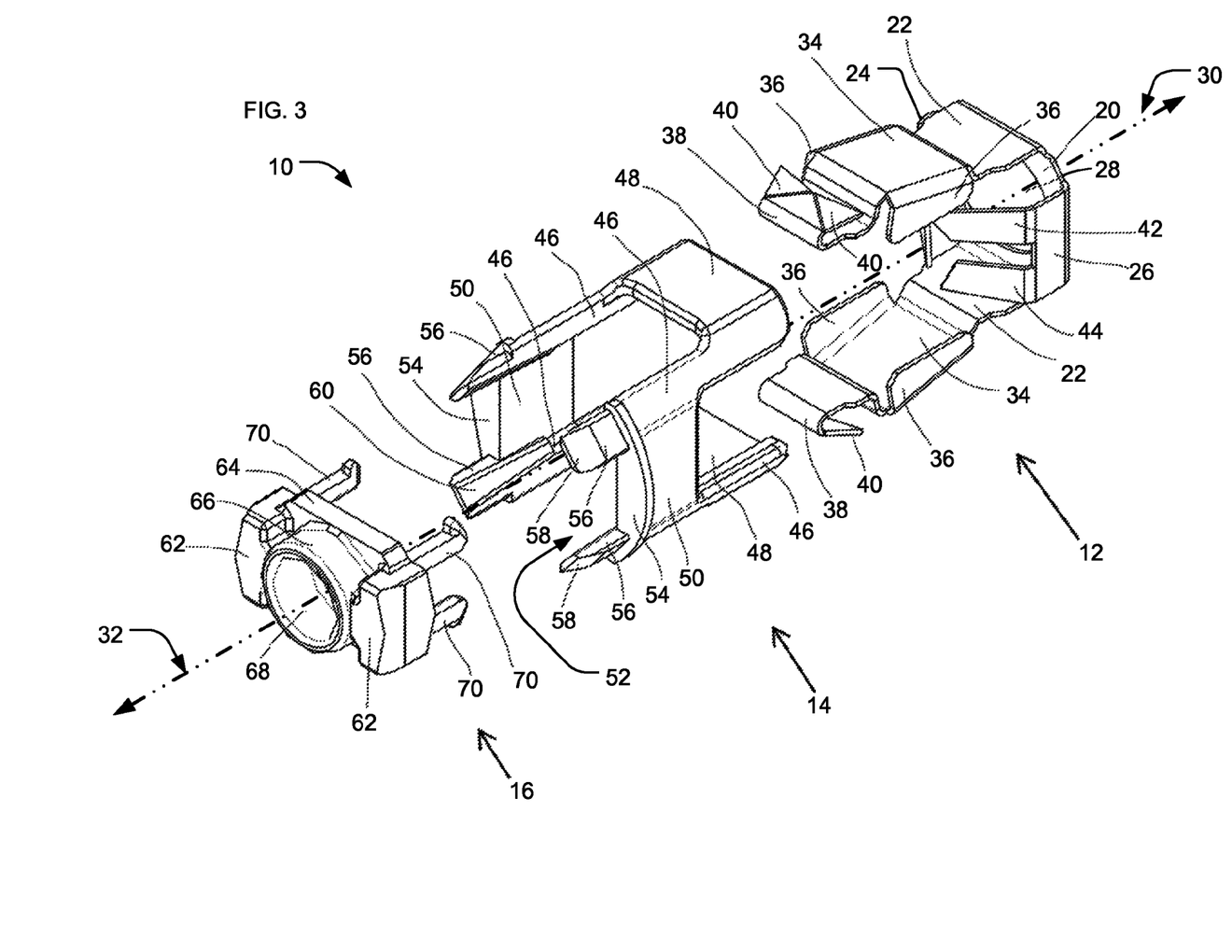
FIG. 3 is an exploded isometric view of the connector of FIG. 1.

FIG. 3 is an exploded isometric view of the connector 10. As shown, the connector 10 here consists of three major components: a spring ring 12, a shell 14, and a block 16. Collectively these components have a longitudinal axis 18, as shown.

The spring ring 12 is preferably made of die-stamped and formed metal (e.g., from galvanized steel sheet), the shell 14 is preferably made of cast metal (e.g., aluminum, zinc, or pots metal), and the block 16 is preferably made of molded plastic (e.g., polycarbonate), although neither these particular materials or these manners of forming them are requirements. FIG. 3 further shows the detailed features of each component.

The first major component of the connector 10 is the spring ring 12. It is resilient and electrically conducting, and it has a base 20, two insertion tabs 22, and two clamping tabs (clamping tab 24 and clamping tab 26). The spring ring 12 has two spring actions, wherein the insertion tabs 22 perform one and the clamping tabs 24, 26 perform the other.

The base 20 is nominally rectangular and has an aperture 28 sized to permit insertion of a cable 3. The base 20 is at a defined trailing end 30 of the connector 10, thus also defining an opposite leading end 32 of the connector 10 (on the block 16, left most in FIG. 3).

The two insertion tabs 22 can be the same in general shape. Each extends, as shown, from opposite sides of the base 20 at an angle of 90 degrees or less. The insertion tabs 22 have a press section 34 that forms a fit/release button, described presently. The press sections 34 can each have two side flanks 36 to close side openings in the connector 10. The insertion tabs 22 are further each extended away from the base 20 and turned up at an angle of greater than 90 degrees, in this case at 155 degrees, to form a respective hook latch 38. The hook latches 38 have two angled corners 40, as shown. As also shown, the corners 40 can optionally have a triangular or curved cutout between adjacent pairs to permit better grip on the inner wall of a panel 1. The corners 40 can also operate to penetrate through a paint or oxidation layer on the inner wall, to reach an underling metal wall material of the panel 1 and thus provide better electrical conductivity and grounding.

The two clamping tabs 24, 26 can also have the same shape, but preferably there are minor differences to facilitate better engagement with the spiral or helix shaped sides of a cable 3. Each clamping tab 24, 26 extends from an opposite side of the base 20 at an angle of about 90 degrees. In FIG. 3 the clamping tab 26 is clearly presented, whereas the clamping tab 24 is almost entirely hidden behind other structure. Each clamping tab 24, 26 has a set of two inward bent prongs, e.g., prongs 42, 44 of clamping tab 26 (clamping tab 24 has a corresponding pair of prongs that are mostly hidden behind other structure in FIG. 3). The respective prongs in each of these sets can also be the same in size and degree of inward bend, but preferably are slightly different, again to facilitate better engagement with the spiral or helix shaped sides of a cable 3, and thus better securing the cable 3 inside the connector 10 and providing better electrical conductivity for grounding.

The second major component of the connector 10 is the shell 14. It is rigid, typically also electrically conducting, and, as shown, it has a nominally octagonal cross section. The shell 14 has four support columns 46, two trailing bridges 48, and two leading bridges 50 that collectively form a through opening 52. The trailing bridges 48 can have optional windows (not shown). The leading bridges 50 each have a respective stopper 54, which preferably is crescent shaped. Extending toward the leading end 32 from the stoppers 54 are a plurality of tongs 56 (four here) that each have a chamfer 58 and a ramp 60. The chamfers 58 are formed on the outward side of each tong 56, and serve to guide the connector 10 inside the aperture 2 of a panel 1 as well as to create support for receiving the block 16. The ramps 60 are formed on the inward side of each tong 56, extending in depth inside the shell 14 and ending at a sharp angle to permit a snap-lock engagement with the block 16.

The third major component of the connector 10 is the block 16. It has two guiding bodies 62 that match the contour of the shell 14 between its tongs 56. The block 16 further has a middle joining wall 64 with a cylinder 66 that includes a through passage 68. The block 16 is completed by a plurality of snapping legs 70 (four here, three visible in FIG. 3).

To assemble the embodiment of the connector 10 depicted in FIG. 3 the spring ring 12 is inserted in a first operation into the through opening 52 of the shell 14 and then the block 16 is inserted in a second operation into the through opening 52 of the shell 14.

The first insertion operation includes inwardly displacing the press sections 34 of the insertion tabs 22 sufficient to permit passage of the insertion tabs 22 between the trailing bridges 48 of the shell 14. Once the spring ring 12 is brought to its final position in the shell 14, the inward displacement is stopped and outward spring action of the press sections 34 occurs, thus trapping the spring ring 12 in the shell 14. In this manner the press sections 34 are used as fit buttons during assembly (and can be used as release buttons for disassembly).

The second insertion operation includes snapping the block 16 into the sub-assembly of the shell 14 and spring ring 12. The block 16 is passed into the through opening 52, with the snapping legs 70 of the block 16 each aligning with a corresponding tong 56 of the shell 14. As such passage proceeds the snapping legs 70 slidingly engage with the ramps 60 of the tongs 56, until the block 16 is brought to its final position. Once the snapping legs 70 extend past the ramps 60 they snap outward within the shell 14, thus locking the block 16 within the sub-assembly of the shell 14 and spring ring 12.

To connect the connector 10 to a panel 1, the press sections 34 of the insertion tabs 22 are pressed, thus inwardly moving the hook latches 38 enough to pass the leading end 32 of the connector 10 into an aperture 2. When then released, the insertion tabs 22 bounce back, outward, to grip into the inner wall of the panel 1.

To connect a cable 3 to the connector 10, the cable 3 is pushed through the hole 28 at the trailing end 30 of the connector 10, until the cable 3 abuts against the block 16, where it is then locked into place by the grip of the prongs (e.g., by the two prongs of clamping tab 24 and the prongs 42, 44 of clamping tab 26).

To disconnect the connector 10 from the panel 1, the press sections 34 of the insertion tabs 22 are again pressed, thus inwardly moving and disengaging the hook latches 38 enough to remove the leading end 32 of the connector 10 from the aperture 2.

To disconnect the connector 10 from the cable 3, the connector 10 can be rotated counter-clockwise to unscrew the connector 10 from the cable 3 (since the prongs of the clamping tabs 24, 26 are in screw-thread-like engagement with the spiral groove of the cable 3).

In summary, it can now be appreciated that the connecting and disconnecting of cables 3 to panels 1 with the connectors 10 can be entirely manual, requiring little effort and no tools. The linear connecting operations of squeezing and inserting a connector into knock out hole or aperture and pressing a cable into the connector permitted by the present connector 10 should especially permit time savings during electrical construction. Similarly, to the extent rarely ever needed, the linear disconnecting operation of squeezing and withdrawing the present connector 10 from a knock out hole or aperture and the rotational disconnecting operation of unscrewing the present connector 10 from a cable will also permit time savings over the use of other types of connectors.

Figure 4:
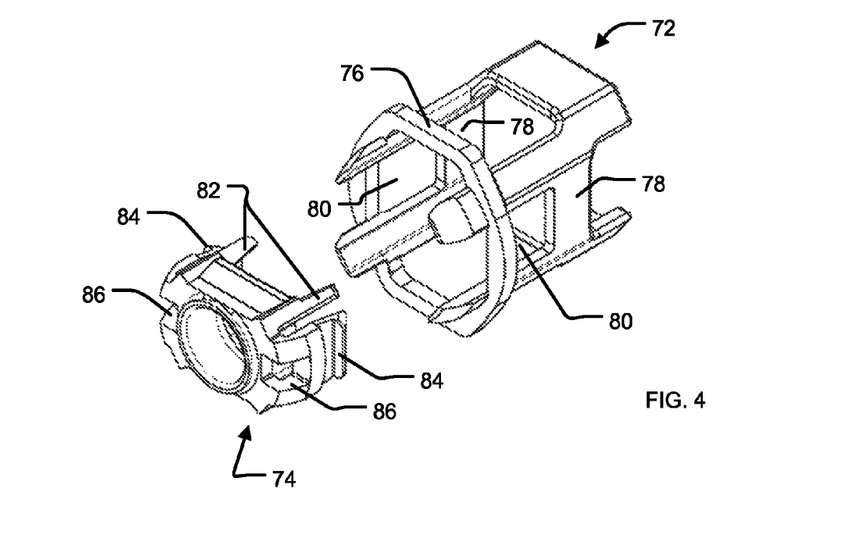
FIG. 4 is an isometric view of alternate shell and an block components that are usable in an alternate embodiment of the connector.
Figure 5A:
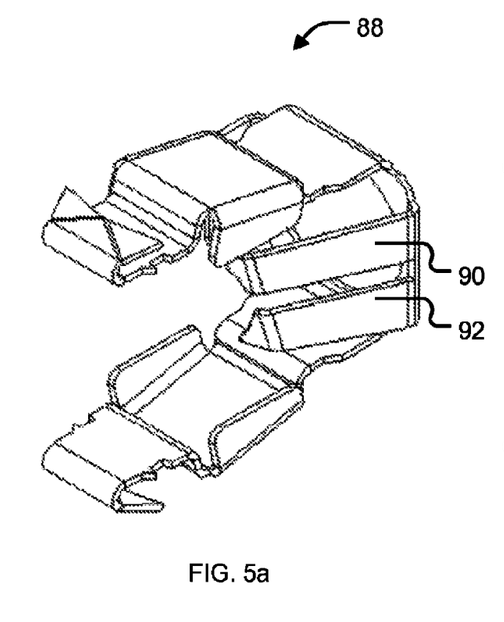
FIGS. 5a-d are isometric, right side, top, and front views, respectively, of an alternate spring ring component that is usable in another alternate embodiment of the connector.
Figure 5B:
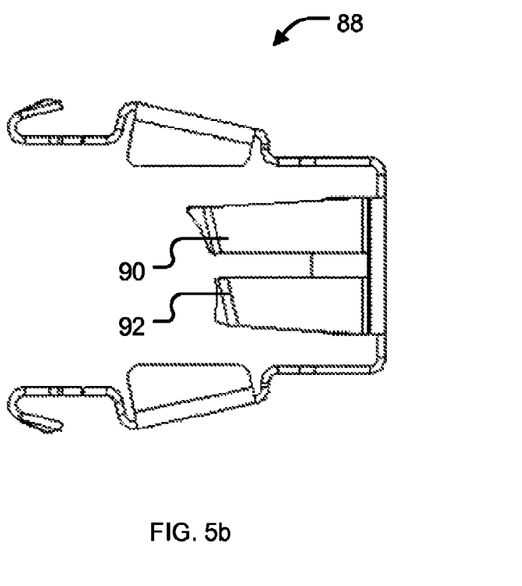
Figure 5C:
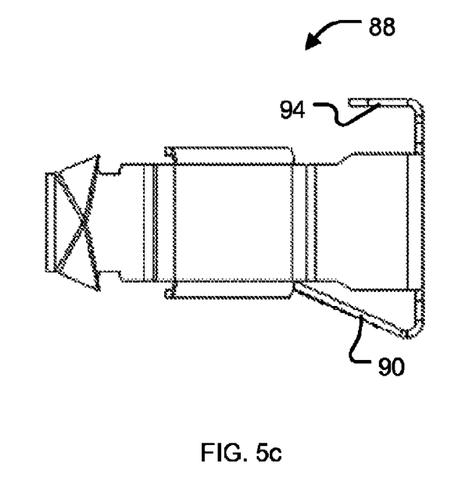
Figure 5D:
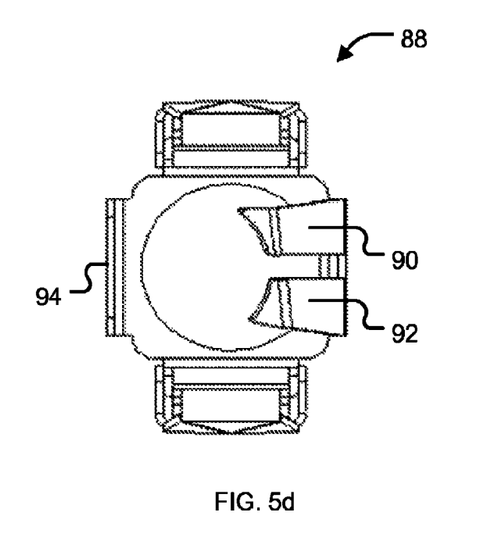

FIG. 4 is an isometric view of an alternate shell 72 and an alternate block 74 that are usable in an alternate embodiment of the connector 10. The same spring ring 12 as used in the connector 10 in FIG. 3 can still be used with these alternate components.

The alternate shell 72 has a bridge ring 76, in contrast with the two stoppers 54 of the shell 14 in FIG. 3. The shell 72 here also has leading bridges 78 that have bridge windows 80, in contrast with the absence of windows in the leading bridges 50 of the shell 14.

The alternate block 74 has alignment legs 82 (two of the four present are visible), in contrast with the snapping legs 70 of the block 16 in FIG. 3. In addition, the block 74 here has two snap prongs 84 (one is clearly visible) that each have a leading window 86. The alignment legs 82 here are used for aligning the block 74 and the shell 72 during assembly, but not for locking these components together. Instead, the snap prongs 84 here each engage with an edge of one of the bridge windows 80 to lock the block 74 and the shell 72 together during assembly. The leading windows 86 permit access to the snap prongs 84, if disassembly is ever desired. Additionally, the leading windows 86 save somewhat on the material needed for the block 74 and they can be used with assembly tooling to orient and hold the block 74 while assembling the connector 10 during manufacture.

FIGS. 5a-d are isometric, right side, top, and front views of an alternate spring ring 88 that is usable in another alternate embodiment of the connector 10. This spring ring 88 may be used with the shell 14 and block 16 in FIG. 3 or with the alternate shell 72 and an alternate block 74 in FIG. 4.

The alternate spring ring 88 has two clamping prongs (clamping prong 90 and clamping prong 92), in contrast with the clamping tab 26 and the prongs 42, 44 in FIG. 3. The spring ring 88 also has a backing tab 94, in contrast with the clamping tab 24 and its prongs in FIG. 3. Assembly of connectors 10 using the alternate spring ring 88 is essentially the same as for the connectors 10 already discussed.

Connecting a cable 3 with a panel 1 using the connector 10 here is also essentially the same in operation from the standpoint of a user, but there is a difference in the principle of operation. When a cable 3 is pushed into the connector 10 here the clamping prongs 90, 92 hold the cable 3 against the backing tab 94, where the cable 3 is then locked into place by the grip of the prongs.

Figure 6:
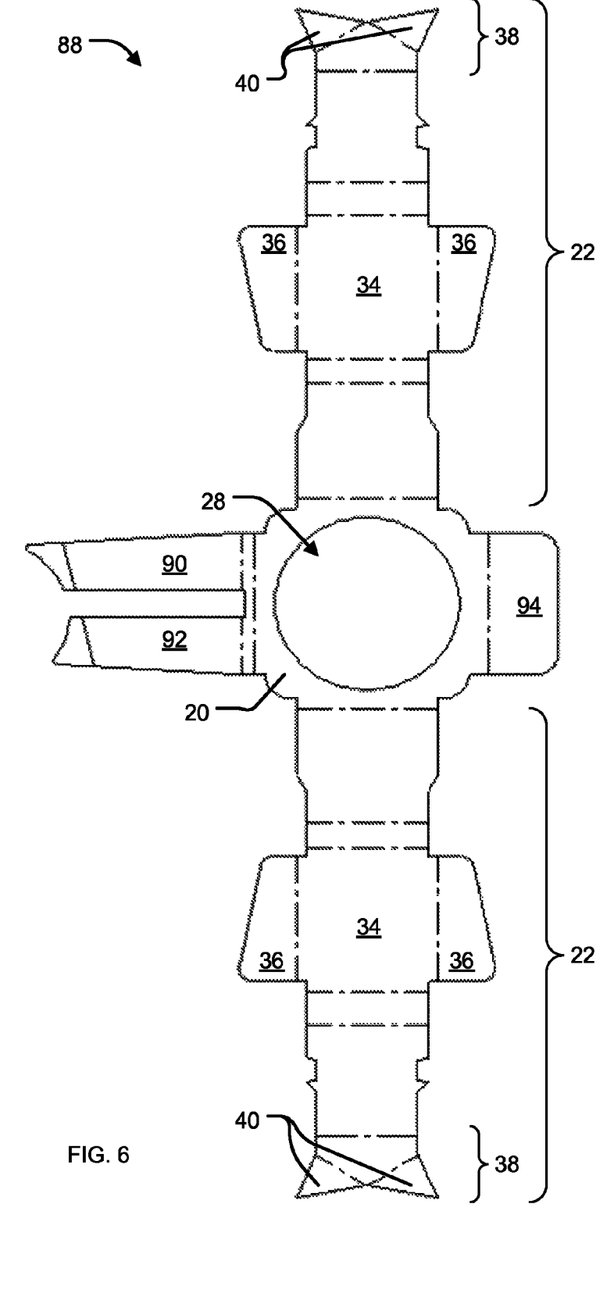
FIG. 6 is a plan view of the alternate spring ring component of FIGS. 5a-d in a partial state of manufacture.

FIG. 6 is a plan view of the alternate spring ring 88 in a partial state of manufacture. The spring ring 88 here has been stamped from sheet metal but has yet to be formed into shape. The reference characters used for the corresponding features in the spring ring 12 have been added to the view of the spring ring 88 here to facilitate overall understanding of the present invention.

Figure 7A:
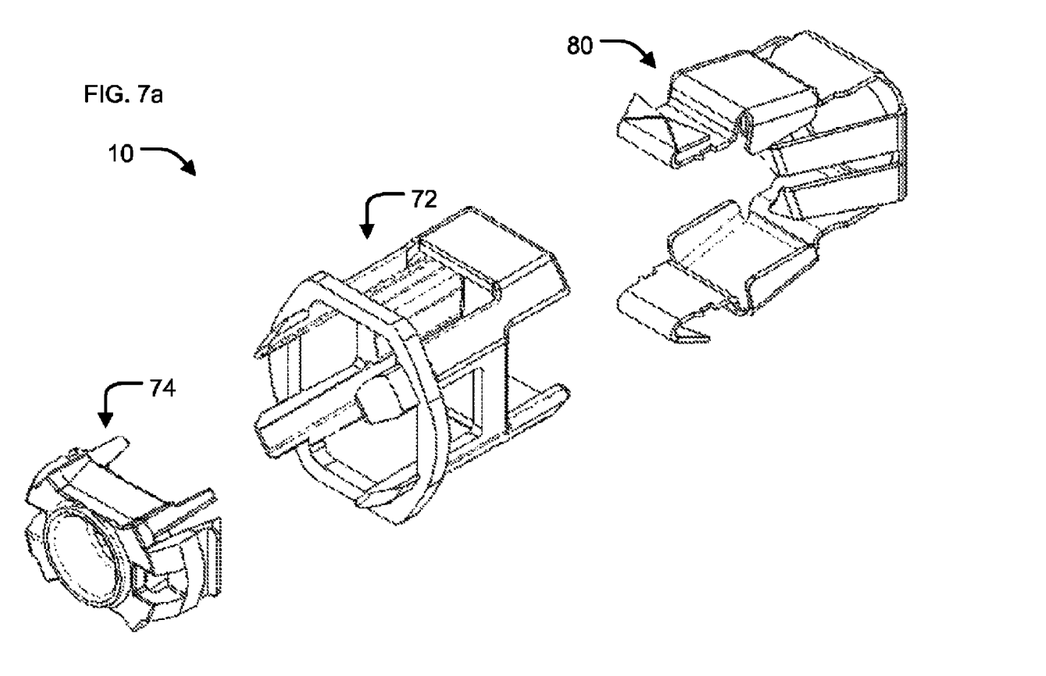
FIGS. 7a-b are exploded and assembled isometric views of an embodiment of the connector using the alternate spring ring, shell, and block components of FIGS. 4 and 5a-d.
Figure 7B:
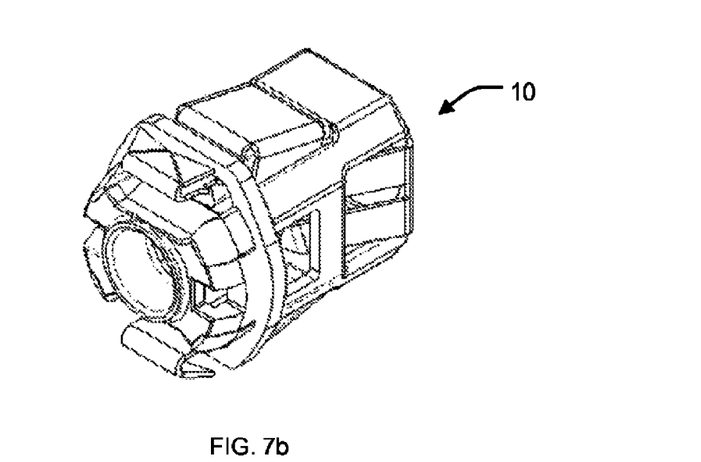

FIGS. 7a-b are exploded and assembled isometric views of an embodiment of the connector 10 using the alternate spring ring 88, alternate shell 72, and alternate block 74.

Figure 8A:
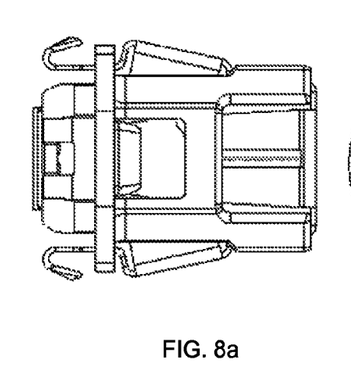
FIGS. 8a-e are right side, front, left side, top and cross-section views, respectively of the connector in FIGS. 7a-b, wherein in FIG. 8e the cross-section is along section A-A in FIG. 8d.
Figure 8B:
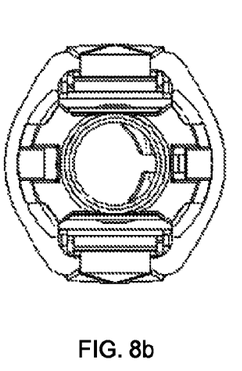
Figure 8C:
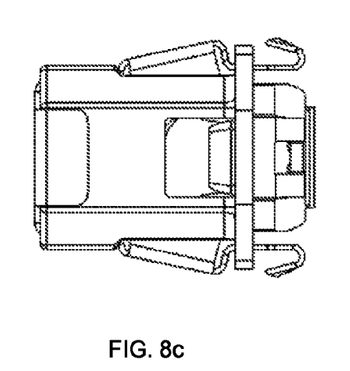
Figure 8D:
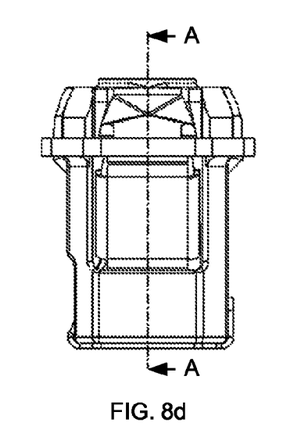
Figure 8E:
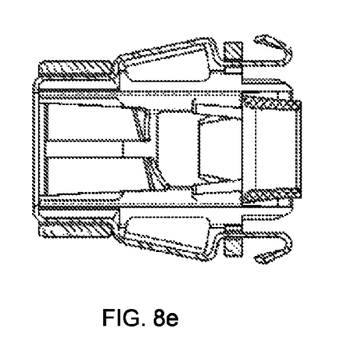
Figure 9A:
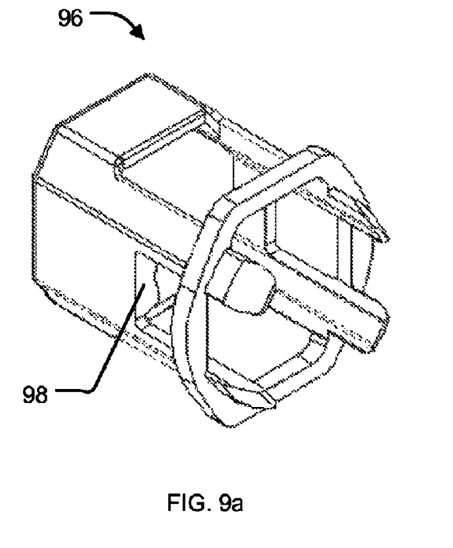
FIGS. 9a-d are isometric, front, left side, and right side views, respectively, of another alternate shell component that is particularly usable with a variation of the spring ring component in FIGS. 5a-d.
Figure 9B:
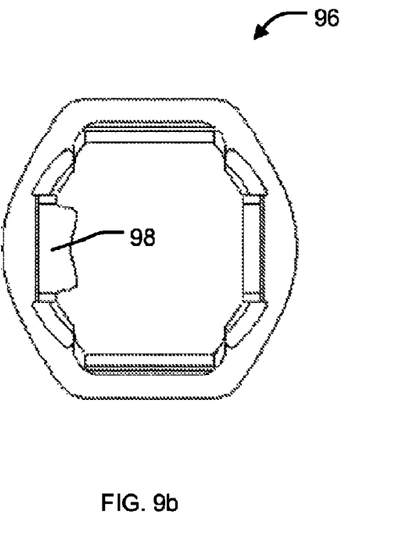
Figure 9C:
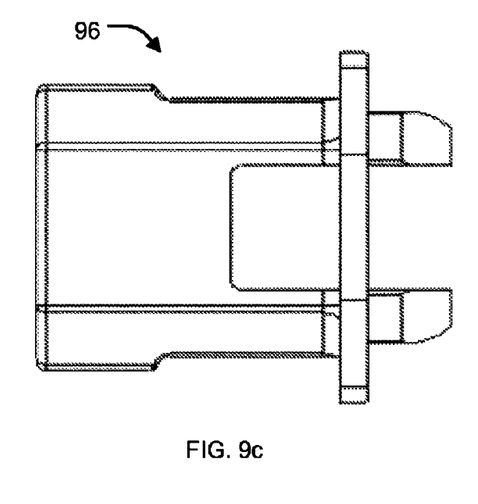
Figure 9D:
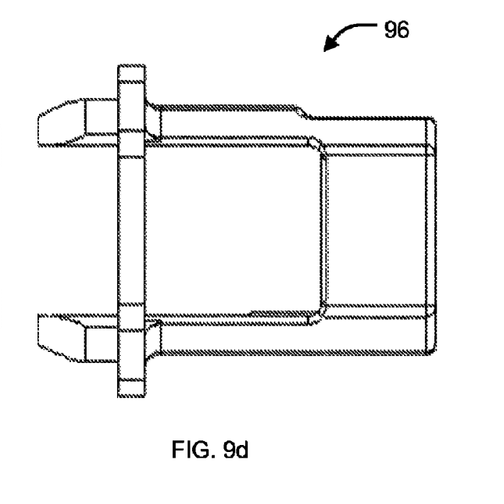

FIGS. 8a-e are right side, front, left side, top and cross-section views of the connector 10 in FIGS. 7a-b. In FIG. 8e the cross-section is along section A-A in FIG. 8d.

FIGS. 9a-d are isometric, front, left side, and right side views of another alternate shell 96 that is particularly usable with a variation of the spring ring 88 in FIGS. 5a-d. The shell 96 is distinguished in that it has a cradle section 98. This shell 96 can be used with the spring ring 88, only where the backing tab 94 there is omitted. With reference also to FIG. 6, it can be seen that the backing tab 94 there is right most protruding feature. By eliminating it entirely, some economy may be achieved in the stamped out blanks from which the spring ring is formed.

Figure 10A:
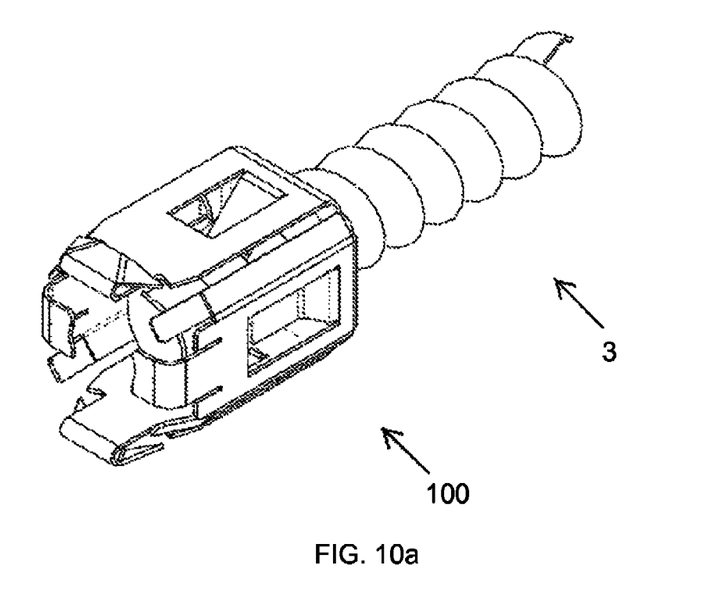
FIGS. 10a-b are isometric and right side views of an exemplary embodiment of an one-piece connector that is also in accord with the present invention.
Figure 10B:
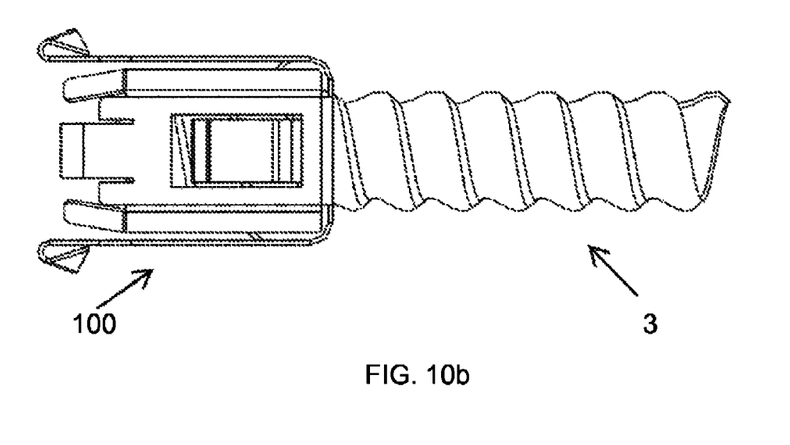
Figure 11A:
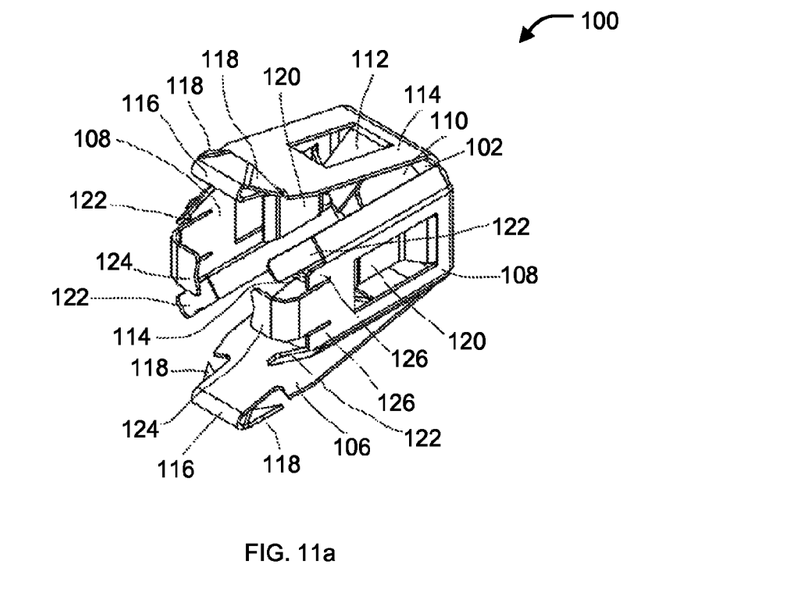
FIGS. 11a-b are detailed and referenced isometric and side views of the one-piece connector in FIGS. 10a-b.
Figure 11B:
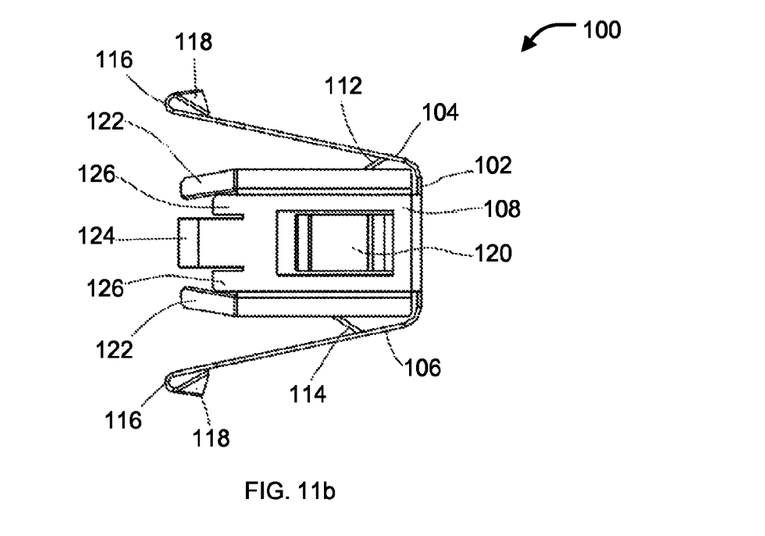

FIGS. 10a-b are isometric and right side views of an exemplary embodiment of an one-piece connector 100 that is also in accord with the present invention. FIGS. 11a-b are detailed and referenced isometric and side views of the one-piece connector 100 in FIGS. 10a-b. The one-piece connector 100 is preferably made of die-stamped and formed metal (e.g., from galvanized steel sheet) thus making it resilient and electrically conducting.

The one-piece connector 100 has a base 102, two locking tabs (locking tab 104 and locking tab 106), and two guide tabs 108. The base 102 is nominally rectangular and has a hole 110 sized to permit insertion of a cable 3. The connector 100 here has two spring actions, wherein the locking tabs 104, 106 perform both (this can be contrasted with the connector 10 where the insertion tabs 22 perform one spring action and the clamping tabs 24, 26 or the clamping prongs 90, 92 perform another spring action).

The two locking tabs 104, 106 can have the same general shape, but preferably there are minor differences, as shown, to facilitate better engagement with the spiral or helix shaped sides of a cable 3. Each locking tab 104, 106 extends, as shown, from opposite sides of the base 102 at an angle of 90 degrees or less. Each locking tab 104, 106 here has one or more prongs 112, 114 cutout and bent inward for gripping a cable 3. Additionally, the two locking tabs 104, 106 are both further extended and turned up to form hook latches 116 that each have two bent sharp corners 118 that can engage and grip into the inner side wall material of a panel 1.

The two guide tabs 108 can also have the same general shape. Each extends, as shown, from opposite sides of the base 102 at an angle of about 90 degrees. Each guide tab 108 has a jugged-in section 120 for supporting a cable 3 (alternately one or more gripping prongs can be used instead of a jugged-in section 120). Each guide tab 108 can optionally also have side wings 122, as shown. Whereas the guide tabs 108 as so far discussed serve to receive and guide a cable 3, the side wings 122 serve to guide, center and help retain the connector 100 in an aperture 2 of a panel 1. Each guide tab 108 further has a free tip 124 that is bent 90 degrees, as shown. These free tips 124 can serve to limit the inward reach of a cable 3 when pushed into the connector 100. Alternately or additionally, these free tips 124 can serve to receive and retain an optional bushing (not shown). If used, such a bushing is preferably made of plastic and call help to prevent abrasion of any wires installed through a cable 3 into the panel 1. Finally, as shown, adjacent to the free tips 124 are side sections 126 (4 total, two clearly visible here) that are left unbent to act as stoppers and limit the protrusion of the connector 100 too far into an aperture 2.

In summary, multiple embodiments of the connectors 10, 100 having major and minor variations have now been disclosed. These connectors 10, 100 save a lot of time and effort over traditional connectors and have other advantages over these and other snapping type connectors, such as eliminating the need for manual use of tools to connect or disconnect the subject connectors 10, 100.

The present invention offers a quick connect connector for an electrical junction box or panel that requires no tools for connection or removal of the connector. Moreover, it needs much less effort and force for installation or removal compared to the existing snapping connectors. Due to its unique design, there are large contact areas between the electrical junction box or panel, the connector, and the jacket of the electrical cable that in turn results in a very good electrical continuity and grounding.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A connector for connecting an electrical cable to an aperture in an electrical panel, comprising:
   a spring ring, a shell, and a block collectively having a longitudinal central axis extending there through when the connector is assembled;
   said spring ring being of one-piece unitary construction and having a base perpendicular to said axis from which two insertion tabs extend nominally coaxial with said axis, and said block having a joining wall and a springing feature, and said shell having a through opening coaxial with said axis, wherein said insertion tabs springingly retain said spring ring in said through opening of said shell, and wherein said springing feature retains said block in said through opening of said shell;
   said insertion tabs of said spring ring having hook latches extending past said block to snappingly lock the connector in the panel when axially pressed into the aperture;
   said base of said spring ring further having a hole to receive the cable when axially pressed into the connector, and a first clamping tab and a second clamping tab to clampably lock the cable in the connector;
   wherein the cable has a spiral or helix shaped side and said first clamping tab and said second clamping tab are differently directed to clamp against the spiral or helix shaped side of the cable;
   wherein the aperture has a circumference and a stopper abutting the connector against the panel is a bridge ring corresponding with the circumference;
   wherein a backing forming a cradle section of said shell extending from said base of said spring ring opposite said at least one clamping prong of said spring ring;
   wherein the panel has wall material proximal to the aperture and the aperture has a circumference, wherein said shell has a bridge ring corresponding with the circumference to abut the connector against the wall material of the panel; and
   wherein each of the insertion tabs further comprises a jugged-in section confining the electrical cable along the longitudinal central axis.

2. The connector of claim 1, wherein said spring ring is made of sheet metal.

3. The connector of claim 1, wherein the panel has wall material proximal to the aperture and said hook latches of said insertion tabs of said spring ring each have at least one corner oriented to grip into the wall material of the panel.

4. The connector of claim 1, wherein the cable has a spiral or helix shaped side and said first clamping tab and said second clamping tab are differently sized to clamp against the spiral or helix shaped side of the cable.

5. The connector of claim 1, wherein the panel has wall material proximal to the aperture and wherein said shell has a stopper to abut the connector against the wall material of the panel.

6. The connector of claim 1, wherein said springing feature of said block is a plurality of legs that snappingly engage with said shell.

7. The connector of claim 1, wherein said block has a plurality of legs that aligningly engage with said shell and springing feature of said block is a plurality of tabs that snappingly engage with said shell.

8. A connector for connecting an electrical cable to an aperture in an electrical panel, comprising:
   a spring ring, a shell, and a block collectively having a longitudinal central axis extending there through when the connector is assembled;
   said spring ring being of one-piece unitary construction and having a base perpendicular to said axis from which two insertion tabs extend nominally coaxial with said axis, and said block having a joining wall and a springing feature, and said shell having a through opening coaxial with said axis, wherein said insertion tabs springingly retain said spring ring in said through opening of said shell, and wherein said springing feature retains said block in said through opening of said shell;
   said insertion tabs of said spring ring having hook latches extending past said block to snappingly lock the connector in the panel when axially pressed into the aperture;
   said base of said spring ring further having a hole to receive the cable when axially pressed into the connector, and at least one clamping prong to clampably hold the cable against a backing to lock the cable in the connector;
   wherein the cable has a spiral or helix shaped side, and a first clamping tab and a second clamping tab are differently directed to clamp against the spiral or helix shaped side of the cable;
   wherein the aperture has a circumference and a stopper abutting the connector against the panel is a bridge ring corresponding with the circumference;
   wherein the backing forms a cradle section of said shell extending from said base of said spring ring opposite said at least one clamping prong of said spring ring;
   wherein the panel has wall material proximal to the aperture and the aperture has a circumference, wherein said shell has a bridge ring corresponding with the circumference to abut the connector against the wall material of the panel; and
   wherein each of the insertion tabs further comprises a jugged-in section confining the electrical cable along the longitudinal central axis.

9. The connector of claim 8, wherein the cable has a spiral or helix shaped side and said at least one clamping prong includes a first prong and a second prong that are differently sized to clamp against the spiral or helix shaped side of the cable.

10. The connector of claim 8, wherein the cable has a spiral or helix shaped side and said at least one clamping prong includes a first prong and a second prong that are differently directed to clamp against the spiral or helix shaped side of the cable.

11. The connector of claim 8, wherein said backing is a backing tab extending from said base of said spring ring opposite said at least one clamping prong.

12. The connector of claim 8, wherein said springing feature of said block snappingly engages with said shell.

13. A one piece connector for holding an electrical cable and connecting the electrical cable to an aperture in an electrical panel, comprising:

the one piece connector defining a longitudinal central axis extending through the one piece connector;

a base perpendicular to the axis, from which two locking tabs and two guide tabs extend nominally coaxial with the longitudinal central axis, and a through opening between the guide tabs coaxial with the longitudinal central axis, wherein the locking tabs springingly retain the one piece connector in the electrical panel;

the locking tabs extending from the base having sharp connectors extending past the guide tabs to snappingly lock the one piece connector in the electrical panel when axially pressed into the aperture;

the base further comprising a hole to receive the electrical cable when axially pressed into the one piece connector, and a plurality of prongs extending from the locking tabs, each of the plurality of prongs directed toward the longitudinal central axis at a different degree, conforming to a spiral contour of the electrical cable such that when the electrical cable is axially pressed into the one piece connector the electrical cable is guided between the prongs and is clampably locked in the one piece connector;

wherein the cable has a spiral or helix shaped side, and the guide tabs comprise a first clamping tab and a second clamping tab differently directed to clamp against the spiral or helix shaped side of the cable;

wherein the aperture has a circumference and a stopper abutting the connector against the panel is a bridge ring corresponding with the circumference;

wherein a backing forms a cradle section of said shell extending from said base of said spring ring opposite said at least one clamping prong of said spring ring;

wherein the panel has wall material proximal to the aperture and the aperture has a circumference, wherein said shell has a bridge ring corresponding with the circumference to abut the connector against the wall material of the panel; and wherein each of the guide tabs further comprises a jugged-in section confining the electrical cable along the longitudinal central axis.

14. The one piece connector of claim 13 wherein each of the guide tabs further comprises side wings that guide, center and help retain the one piece connector in the aperture.

15. The one piece connector of claim 13 wherein each of the guide tabs further comprises a free tip limiting inward reach of the electrical cable when pushed into the one piece connector.

* * * * *